US007379998B2

(12) United States Patent
Love et al.

(10) Patent No.: US 7,379,998 B2
(45) Date of Patent: May 27, 2008

(54) SYSTEM AND METHOD FOR MULTI-PLATFORM QUEUE QUERIES

(75) Inventors: Lorraine Love, Swanage (GB); Max Breslin, Poole (GB); Blair Hyland, Bournemouth (JP); Corinne Fowke, Bournemouth (GB)

(73) Assignee: JP Morgan Chase Bank, New York, NY (US)

( * ) Notice: Subject to any disclaimer, the term of this patent is extended or adjusted under 35 U.S.C. 154(b) by 796 days.

(21) Appl. No.: 10/647,159

(22) Filed: Aug. 22, 2003

(65) Prior Publication Data

US 2004/0215725 A1  Oct. 28, 2004

Related U.S. Application Data

(60) Provisional application No. 60/459,328, filed on Apr. 1, 2003, provisional application No. 60/459,134, filed on Mar. 31, 2003.

(51) Int. Cl.
*G06F 15/173* (2006.01)
(52) U.S. Cl. .................. 709/224; 709/202; 719/314
(58) Field of Classification Search ............ 709/202, 709/224; 719/314
See application file for complete search history.

(56) References Cited

U.S. PATENT DOCUMENTS

| 4,751,702 A | 6/1988 | Beier et al. |
| 5,027,269 A | 6/1991 | Grant et al. |
| 5,301,320 A | 4/1994 | McAtee et al. |
| 5,325,527 A | 6/1994 | Cwikowski et al. |
| 5,499,371 A | 3/1996 | Henninger et al. |
| 5,539,885 A | 7/1996 | Ono et al. |
| 5,553,235 A | 9/1996 | Chen et al. |
| 5,566,297 A | 10/1996 | Devarakonda et al. |
| 5,594,863 A | 1/1997 | Stiles |
| 5,630,047 A | 5/1997 | Wang |
| 5,630,173 A | 5/1997 | Oprescu |
| 5,673,403 A | 9/1997 | Brown et al. |

(Continued)

FOREIGN PATENT DOCUMENTS

WO  01/35209  5/2001

(Continued)

OTHER PUBLICATIONS

Baker, Fred. "MIB for FIFO, Priority, Custom, and Fair Queuing" Cisco Systems, Inc. May 1995.*

(Continued)

*Primary Examiner*—Nathan J. Flynn
*Assistant Examiner*—Michael E Keefer
(74) *Attorney, Agent, or Firm*—Lowenstein Sandler, PC

(57) ABSTRACT

A system and method that provides a cross-platform queue viewer for use in a distributed processing system comprising a plurality of operational platforms that cooperate to perform various functions and tasks. The queues may be, for example, message queues in a distributed operating environment. A web browser is in communication with an application server. The web browser provides the application server with information regarding a query request. The application server communicates this request to one or more message servers. The message server communicates queue information responsive to the query back to the application server. The application server processes this information into a form that is easily understood by the requester.

17 Claims, 7 Drawing Sheets

U.S. PATENT DOCUMENTS

| | | |
|---|---|---|
| 5,689,698 A | 11/1997 | Jones et al. |
| 5,692,181 A | 11/1997 | Anand et al. |
| 5,712,971 A | 1/1998 | Stanfill et al. |
| 5,717,925 A | 2/1998 | Harper et al. |
| 5,732,262 A | 3/1998 | Gillespie et al. |
| 5,734,887 A | 3/1998 | Kingberg et al. |
| 5,737,592 A | 4/1998 | Nguyen et al. |
| 5,761,499 A | 6/1998 | Sonderegger |
| 5,768,119 A | 6/1998 | Havekost et al. |
| 5,784,557 A | 7/1998 | Oprescu |
| 5,790,809 A | 8/1998 | Holmes |
| 5,801,689 A | 9/1998 | Huntsman |
| 5,802,367 A | 9/1998 | Held et al. |
| 5,806,075 A | 9/1998 | Jain et al. |
| 5,815,415 A | 9/1998 | Bentley et al. |
| 5,845,292 A | 12/1998 | Bohannon et al. |
| 5,889,992 A | 3/1999 | Koerber |
| 5,899,990 A | 5/1999 | Maritzen et al. |
| 5,926,637 A | 7/1999 | Cline et al. |
| 5,930,768 A | 7/1999 | Hooban |
| 5,937,198 A | 8/1999 | Nelson et al. |
| 5,937,402 A | 8/1999 | Pandit |
| 5,946,458 A | 8/1999 | Austin et al. |
| 5,949,412 A | 9/1999 | Huntsman |
| 5,960,200 A | 9/1999 | Eager et al. |
| 5,960,445 A | 9/1999 | Tamori et al. |
| 5,987,247 A | 11/1999 | Lau |
| 5,999,179 A | 12/1999 | Kekic et al. |
| 6,003,075 A | 12/1999 | Arendt et al. |
| 6,009,274 A | 12/1999 | Fletcher et al. |
| 6,009,405 A | 12/1999 | Leymann et al. |
| 6,011,916 A | 1/2000 | Moore et al. |
| 6,046,742 A | 4/2000 | Chari |
| 6,052,456 A | 4/2000 | Huang |
| 6,065,009 A | 5/2000 | Leymann et al. |
| 6,083,276 A | 7/2000 | Davidson et al. |
| 6,101,489 A | 8/2000 | Lannert et al. |
| 6,101,601 A | 8/2000 | Matthews et al. |
| 6,108,698 A | 8/2000 | Tenev et al. |
| 6,148,296 A | 11/2000 | Tabbara |
| 6,163,776 A | 12/2000 | Periwal |
| 6,173,439 B1 | 1/2001 | Carlson et al. |
| 6,178,409 B1 | 1/2001 | Weber et al. |
| 6,184,996 B1 | 2/2001 | Gase |
| 6,185,613 B1 | 2/2001 | Lawson et al. |
| 6,195,676 B1 | 2/2001 | Spix et al. |
| 6,226,684 B1 | 5/2001 | Sung et al. |
| 6,230,319 B1 | 5/2001 | Britt, Jr. et al. |
| 6,246,410 B1 | 6/2001 | Bergeron et al. |
| 6,249,877 B1 | 6/2001 | Kawakami et al. |
| 6,253,193 B1 | 6/2001 | Ginter et al. |
| 6,272,556 B1 | 8/2001 | Gish |
| 6,282,698 B1 | 8/2001 | Baker et al. |
| 6,288,790 B1 | 9/2001 | Yellepeddy et al. |
| 6,289,336 B1 | 9/2001 | Melton et al. |
| 6,292,933 B1 | 9/2001 | Bahrs et al. |
| 6,298,353 B1 | 10/2001 | Apte |
| 6,304,871 B1 | 10/2001 | Gajda et al. |
| 6,314,430 B1 | 11/2001 | Chang |
| 6,317,738 B1 | 11/2001 | Lohman et al. |
| 6,324,525 B1 | 11/2001 | Kramer et al. |
| 6,324,619 B1 | 11/2001 | Raverdy et al. |
| 6,332,161 B1 | 12/2001 | Sasson |
| 6,353,820 B1 | 3/2002 | Edwards et al. |
| 6,363,363 B1 | 3/2002 | Haller et al. |
| 6,363,499 B1 | 3/2002 | Delo et al. |
| 6,381,609 B1 | 4/2002 | Breitbart et al. |
| 6,430,556 B1 | 8/2002 | Goldberg et al. |
| 6,438,749 B1 | 8/2002 | Chamberlain |
| 6,442,533 B1 | 8/2002 | Hinkle |
| 6,442,748 B1 | 8/2002 | Bowman-Amuah |
| 6,453,127 B2 | 9/2002 | Wood et al. |
| 6,463,343 B1 | 10/2002 | Emens et al. |
| 6,463,439 B1 | 10/2002 | Dahlberg |
| 6,467,079 B1 | 10/2002 | Ettritch et al. |
| 6,470,384 B1 | 10/2002 | O'Brian et al. |
| 6,473,786 B1 | 10/2002 | Scouras et al. |
| 6,477,580 B1 | 11/2002 | Bowman-Amuah |
| 6,477,590 B1 | 11/2002 | Habusha et al. |
| 6,480,860 B1 | 11/2002 | Monday |
| 6,480,894 B1 | 11/2002 | Courts et al. |
| 6,484,310 B1 | 11/2002 | Przbylski et al. |
| 6,502,095 B2 | 12/2002 | Breitbart et al. |
| 6,502,207 B1 | 12/2002 | Itoh et al. |
| 6,505,238 B1 | 1/2003 | Tran |
| 6,510,352 B1 | 1/2003 | Badavas et al. |
| 6,518,983 B1 | 2/2003 | Grohmann et al. |
| 6,526,571 B1 | 2/2003 | Aizikowitz et al. |
| 6,539,337 B1 | 3/2003 | Provan et al. |
| 6,546,419 B1 | 4/2003 | Humpleman et al. |
| 6,553,428 B1 | 4/2003 | Ruehle et al. |
| 6,557,039 B1 | 4/2003 | Leong et al. |
| 6,571,282 B1 | 5/2003 | Bowman-Amuah |
| 6,571,389 B1 | 5/2003 | Spyker et al. |
| 6,578,068 B1 | 6/2003 | Bowman-Amuah |
| 6,584,497 B1 | 6/2003 | Case et al. |
| 6,590,587 B1 | 7/2003 | Wichelman et al. |
| 6,615,258 B1 | 9/2003 | Barry et al. |
| 6,643,679 B1 | 11/2003 | Erickson et al. |
| 6,654,784 B1 | 11/2003 | Wei |
| 6,657,625 B1 | 12/2003 | Chik et al. |
| 6,675,228 B1 | 1/2004 | Bahrs et al. |
| 6,704,805 B1 * | 3/2004 | Acker et al. ............... 719/315 |
| 6,725,231 B2 | 4/2004 | Hu et al. |
| 6,772,031 B1 * | 8/2004 | Strand ............... 715/736 |
| 6,928,488 B1 | 8/2005 | de Jong et al. |
| 6,950,850 B1 | 9/2005 | Leff |
| 2001/0020255 A1 | 9/2001 | Hofmann et al. |
| 2001/0029604 A1 | 10/2001 | Dreyband et al. |
| 2002/0010867 A1 | 1/2002 | Schaefer et al. |
| 2002/0046239 A1 | 4/2002 | Stawikowski et al. |
| 2002/0055804 A1 | 5/2002 | Betawar et al. |
| 2002/0062475 A1 | 5/2002 | Iborra et al. |
| 2002/0065814 A1 | 5/2002 | Okamoto et al. |
| 2002/0069156 A1 | 6/2002 | Adam et al. |
| 2002/0069192 A1 | 6/2002 | Aegerter |
| 2002/0078115 A1 | 6/2002 | Poff et al. |
| 2002/0103725 A1 | 8/2002 | Martin et al. |
| 2002/0103835 A1 | 8/2002 | Kearney |
| 2002/0109718 A1 | 8/2002 | Mansour et al. |
| 2002/0111995 A1 | 8/2002 | Mansour et al. |
| 2002/0111999 A1 | 8/2002 | Andersson |
| 2002/0116205 A1 | 8/2002 | Ankireddipally et al. |
| 2002/0120685 A1 | 8/2002 | Srivastava et al. |
| 2002/0124054 A1 | 9/2002 | Dorn et al. |
| 2002/0124113 A1 | 9/2002 | Gargya et al. |
| 2002/0129096 A1 | 9/2002 | Mansour et al. |
| 2002/0133461 A1 | 9/2002 | Ramchandran |
| 2002/0133579 A1 | 9/2002 | Bernhardt et al. |
| 2002/0143721 A1 | 10/2002 | Charlet et al. |
| 2002/0143819 A1 | 10/2002 | Han et al. |
| 2002/0144101 A1 | 10/2002 | Wang et al. |
| 2002/0147857 A1 | 10/2002 | Sanchez, II et al. |
| 2002/0178191 A1 | 11/2002 | Sielken |
| 2002/0178434 A1 | 11/2002 | Fox et al. |
| 2002/0188765 A1 | 12/2002 | Fong et al. |
| 2002/0188928 A1 | 12/2002 | Szpak et al. |
| 2003/0009323 A1 | 1/2003 | Adeli |
| 2003/0028555 A1 | 2/2003 | Young et al. |
| 2003/0033121 A1 | 2/2003 | Chen et al. |
| 2003/0033159 A1 | 2/2003 | Altomare |
| 2003/0036809 A1 | 2/2003 | Landman et al. |
| 2003/0046317 A1 | 3/2003 | Cseri et al. |
| 2003/0050897 A1 | 3/2003 | Altomare |

| | | | |
|---|---|---|---|
| 2003/0069907 | A1 | 4/2003 | Moreau et al. |
| 2003/0084067 | A1 | 5/2003 | Obiaya |
| 2003/0093574 | A1 | 5/2003 | Fablet et al. |
| 2003/0097383 | A1 | 5/2003 | Smirnov et al. |
| 2003/0145132 | A1 | 7/2003 | Srinivasan |
| 2003/0160813 | A1 | 8/2003 | Raju |
| 2003/0167456 | A1 | 9/2003 | Sabharwal |
| 2003/0217033 | A1 | 11/2003 | Sandler et al. |
| 2004/0024579 | A1* | 2/2004 | Nusbickel et al. ............ 703/27 |
| 2004/0107183 | A1 | 6/2004 | Mangan |
| 2004/0220952 | A1 | 11/2004 | Cheenath |
| 2004/0230587 | A1 | 11/2004 | Doddington |
| 2005/0030555 | A1 | 2/2005 | Phenix et al. |
| 2006/0200535 | A1 | 9/2006 | Moser |

FOREIGN PATENT DOCUMENTS

| | | |
|---|---|---|
| WO | 01/63529 | 8/2001 |
| WO | 02/46916 | 6/2002 |
| WO | 02/46980 | 6/2002 |
| WO | 03/001373 | 1/2003 |

OTHER PUBLICATIONS

Shannon, Bill. "Java 2 Plantform Enterprise Edition Specification v1.2" p. 1-1. Dec. 17, 1999.*
IBM TDB. "Bloodhound Server Monitor Package" Jul. 1, 2000.*
Thomas; Enterprise Javabeans(TM) Technology: Server Component Model for the Java(TM) Platform Java.Sun.Com, May 2, 1999.
Rennhackkamp; One for the Road: Sybase/-ES Adaptive Server Anywhere 6.0, M&T Publishing Inc., Section No. 10, vol. 11, p. 55, ISSN. 1041-5173.
McClanahan; Powerbuilder3.0, M&T Publishing Inc., vol. 6, No. 11, p. 57, ISSN. 1041-5173, Oct. 1993.
Unknown; Conjuring up COM Through Scripting, p. 14, Jul. 2000.
Quantum SPC/DC Script file (.TDF) Definition Instruction Guide, ASI Data Myte Inc., Version 2.4, p. 2-14.
Myers; Scripting Graphical Applications by Demonstration, Human Computer Interaction Institute, Carnegie Mellon University, www.cs.cmu.edu/bam, p. 1-8, Apr. 1998.
Ousterhoust; Scripting Higher Level Programming for the 21st Century, Sun Microsystems Laboratories, Draft #2, p. 1-14, May 10, 1997.
Dolev, et al.; An Integrated Architecture for the Scalable Delivery of Semi-Dynamic Web Content, Proceedings of the Seventh International Symposium on Computers and Communications, IEEE, 2002.
BETWIXT: Turning Beans into XML, Apache Software Foundation, Archived Jun. 20, 2002 at <http://web.archive.org/web/20020620000410/http://jakarta.apahce.org.commons/betwixt/>, p. 1 of 1, Nov. 13, 2005.
XML Schema Part 0 Primer-W3C Working Draft, W3C, Feb. 2000, Retrieved from the Internet on Nov. 18, 2005 at <http://www.w3.org/tr/2000/wd-xmlschema-0-20000225/>, 42 pages.
Frank M. Carrano, et al.; Frank M. Carrano, et al., Data Abstraction and Problem Solving with C++, Aug. 1998, Addison-Wesley, Chapter 2.
Brodkin; Brodkin, Use XML Data Binding to do your Laundry, Retrieved from the Internet on May 19, 2006, Acessed and Printed from from the Internet on May 19, 2006 at http://www.javaworld.com/javaworld/jw-12-2001/jw-1228-jaxb.html.
Strict Read Order Control for a Queing System,spi.org, Mar. 2002.
Beginning of Viewing Information and Viewing Basic Information about a Print from 5 Managing Print Queues,spi.org, Jun. 1, 1993.
x4queview spi.org, Mar. 1992.

* cited by examiner

SYSTEM AND METHOD FOR MULTI-PLATFORM QUEUE QUERIES

CROSS-REFERENCE TO RELATED APPLICATION

This patent application is related to and claims the benefit of Provisional U.S. Patent Application No. 60/459,328 filed on Apr. 1, 2003, which application is hereby incorporated herein by reference in its entirety and Provisional U.S. Patent Application No. 60/459,134 filed on Mar. 31, 2003.

FIELD OF THE INVENTION

The present invention relates to the field of distributed data processing, and, more specifically, to a system and method that permits a user to determine length and content of process queues across multiple platforms in a distributed data processing system.

BACKGROUND OF THE INVENTION

In modern distributed data processing systems, developers and users alike frequently have time-sensitive communications needs. For example, a developer needs to know how to route messages so that they are expeditiously delivered. A user may also need to know what is happening to a time-sensitive transaction. In both cases, the user needs to know what is happening with messages on communication queues.

Most systems have some queue query function. These functions, however, frequently can only query one queue at a time and must be run repeatedly to determine a complete picture of the state of the system. Other systems can only query a specific platform and not the entire distributed system. Still others require that the user have administrator privileges on one or more of the platforms in the distributed system.

Therefore, a problem in the art is that there is no manner in which a developer or user can obtain complete information about the state of queues in a distributed system.

SUMMARY OF THE INVENTION

This problem is solved and a technical advance is achieved in the art by a system and method that provides a cross-platform queue viewer for use in a distributed processing system comprising a plurality of operational platforms that cooperate to perform various functions and tasks. The queues may be, for example, message queues in a distributed operating environment (such as JAVA).

According to an exemplary embodiment of this invention, a web browser is in communication with an application server. The web browser provides the application server with information regarding a query request. The application server communicates this request to one or more message servers. The message server communicates queue information responsive to the query back to the application server. The application server processes this information into a form that is easily understood by the requester.

Advantageously, the application server comprises a J2EE application server, which sorts queue information received into a plurality of categories. A tree renderer advantageously receives the sorted categories and derives a tree structure, which is delivered to the web browser.

BRIEF DESCRIPTION OF THE DRAWINGS

A more complete understanding of the invention can be obtained from a consideration of the specification in conjunction with the drawings, in which.

DETAILED DESCRIPTION

This invention introduces a new capability into the art: the ability to query multiple queues on multiple, distributed platforms and then report the results in an easy-to-understand format. For purposes of this application, this capability is called "Message Inspector." In order to aid in the understanding of the functionality of this exemplary embodiment of this invention, the goals of this invention are presented.

1. Easy to Use

As most people are familiar with using Microsoft Explorer's tree-like navigation interface, this exemplary embodiment of this invention takes advantage of a generic tree navigation interface available as a common utility (within the GOODS toolkit), which provides for reuse.

2. Simple to Set Up

This exemplary embodiment of this invention employs Java Server Pages (JPS) and Java Beans for the front end running on a Websphere application server. This implementation has the advantage of no client-side installation, which enables a user to access Message Inspector from any machine with a web browser. On the Message Server side (as will be described further, below), a Java RMI server is installed, which carries out Java Message Service (JMS) work using JMS Provider Java. Therefore, there is a once-only installation on the Websphere application server and a once-only installation on each JMS Provider server machine.

3. Efficient

The user interface on the Websphere application server must be responsive (like any browser application). To this end, Message Inspector includes a user-configurable message limit, which defaults to 50 messages. If a queue is filled to its respective capacity, then it is not necessary to retrieve all messages and wait for the tree to be redrawn. However, if the user does want to see all messages on a queue, he or she is able to do so by choosing to set the message limit to the maximum.

4. Robust

The idea behind Message Inspector is to aid production support and application development and not to add to their work load. Thus, Message Inspector is a robust application which requires little or no intervention once it is installed. Error handling is given a high priority and all problems are reported to its own error logs. Message Inspector is started when the underlying platform is rebooted and the J2EE Application Server (as will be described below) is running.

5. Read Only

Message Inspector provides a read-only interface so no one can inadvertently remove messages or queues and affect the JMS Provider's guaranteed messaging environment.

6. Secure

Messages may contain sensitive business data that only authorized personnel should be able to access with Message Inspector. This authorization is achieved by using a web portal login servlet which authenticates a user against a valid database account.

Figure 1:
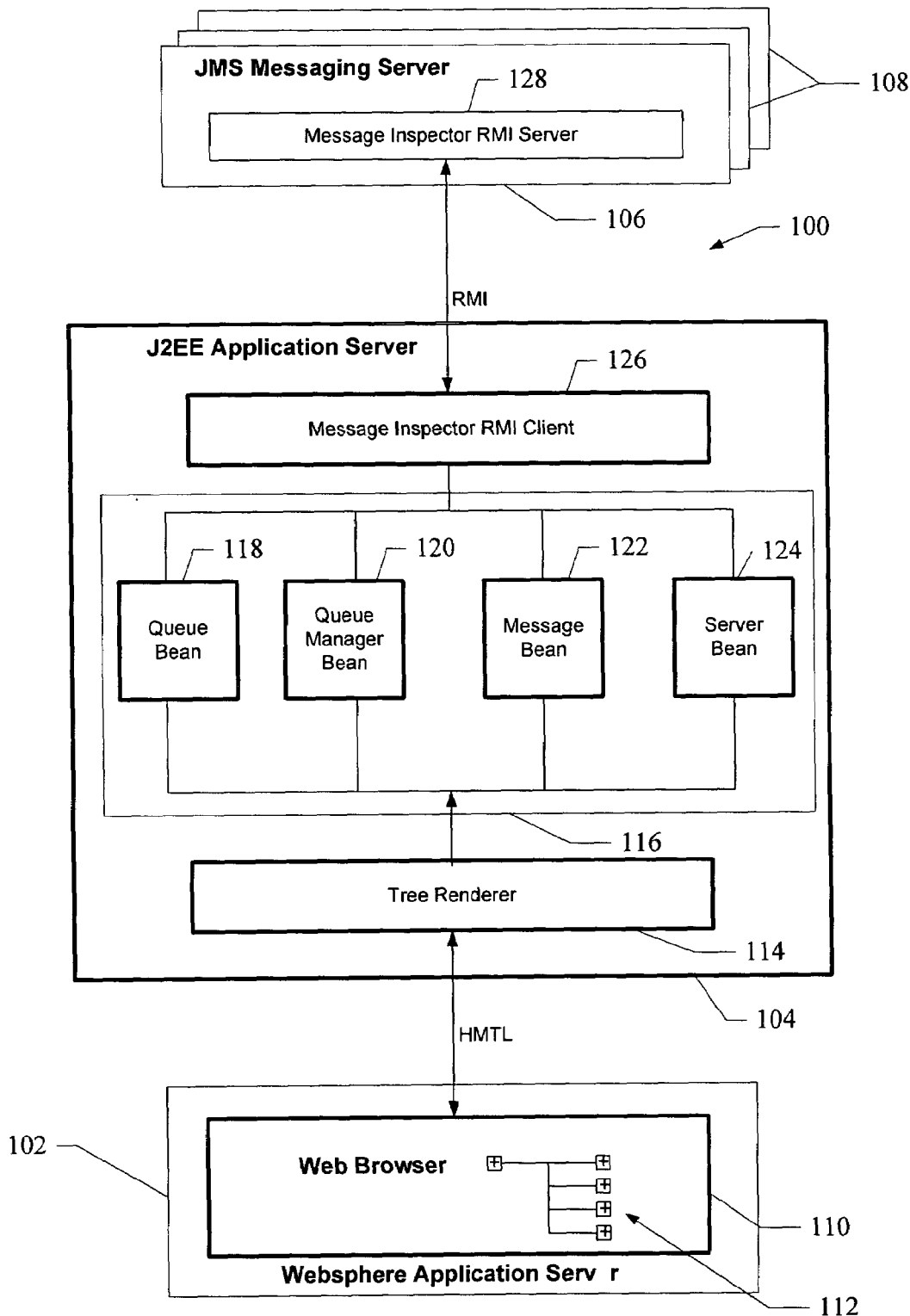
FIG. 1 depicts a block diagram of an application architecture for an illustrative embodiment of the present invention.

FIG. 1 shows the application architecture 100 of an illustrative embodiment of a Message Inspector according to this invention. The three main components illustrated are the Websphere Application server 102, a J2EE Application Server 104 and a JMS Messaging server 106. There may be more than one JMS Messaging server, as indicated by 108. Each of Servers 102, 104, 106, and 108 can include one or more computer readable memory devices and one or more processors coupled to the memory devices as is known to those of skill in the art. Alternatively, one or more of the servers 102, 104, 106. and 108 can run on a single processor with an associated computer readable memory device as is known to those of skill in the art.

A web browser 110, as is well known in the art and therefore not further discussed, is running on the Websphere Application server 102, which is illustrated as running Message Inspector. A tree structure 112 is illustrated in web browser 110. "+" signs indicate that there are further entries. The user may expand the visible tree structure 112 by activating (for example, by way of a mouse click) a "+" sign. Tree structure 112 is delivered to Websphere application server 102 and web browser 110 from J2EE Application Server by means of HTML (which is well known in the art and therefore not further discussed).

The J2EE Application Server 104 components added to implement the illustrative embodiment of this invention are shown in box 104. The GOODS HTML Tree Renderer 114 generates HTML tree structure 112. A Message Inspector tree 116 includes the following nodes or categories: the Queues 118, the Queue Managers 120, the Messages 122 and the Messaging Servers 124. Each category is represented by a bean, which generate input to Tree Renderer 114 and is responsible for generating the list of entities (i.e., queues, messages, etc.) at a position in the tree.

Also included in the J2EE Application Server 104 is a Message Inspector RMI Client 126. Message Inspector RMI Client 126 is responsible for all RMI interaction with a Message Inspector RMI Server 128 within JMS Messaging Server 106. Message Inspector RMI Server 128 acts as a proxy for calls to the JMS Messaging Server 128. The JMS Messaging Server 106 represents the server machine which actually holds queue managers and their respective queues.

In operation, Message Inspector RMI Client 128 is controlled by the set of java beans (categories) 118, 120, 122 and 124, which act as data sources for the HTML Tree Renderer 114. The Tree Renderer 114 generates HTML to send to the web browser 110. The list of JMS Messaging Servers 106, 108 is held in a properties file in Message Inspector RMI Client 126, as is the RMI registry number.

Addition of a new JMS Messaging Server, such as 108, requires a restart of the application. Everything else is found at runtime.

The set of java beans (categories) 118, 120, 122 and 124 use RMI communication when they require interaction with JMS Messaging Server 106. Each JMS Provider's Messaging Server 106, 108 includes an installed Message Inspector Server 128. This is an activatable RMI Server. The Message Inspector RMI Server 128 is responsible for all interaction with the JMS Messaging Server 106 and uses the JMS API. The Message Inspector RMI Server 128 extends the "java.rmi.activation.Activatable" class, which allows it to be invoked remotely, provided it is registered with the RMI activation demon.

A setup class is also provided, which runs on the JMS Messaging Server 106. This class, called "SetupMessageInspector," declares the Message Inspector RMI Server's 128 remote interface and registers it with the RMI activation demon, binding the stub to a name in the RMI registry. This needs to be run when the JMS Messaging Server 106 is restarted. A script is provided for this purpose that runs the RMI registry, the RMI activation demon and the SetupMessageInspector class.

Figure 2:
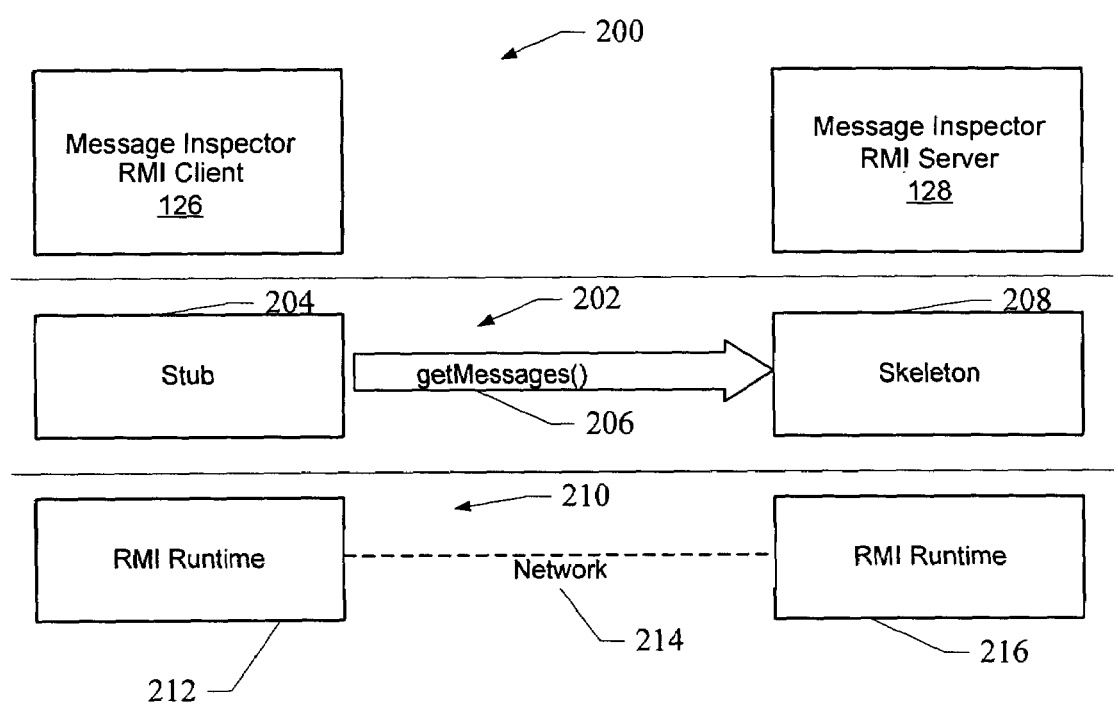
FIG. 2 depicts a block diagram of the remote method invocation runtime structure for message communication of FIG. 1.

Turning now to FIG. 2, a brief illustration of RMI processing is shown. FIG. 2 shows the RMI Runtime structure used to make a call to the method "getMessages." A top layer is the application specific layer 200, which includes the Message Inspector RMI Client 126 and the Message Inspector RMI Server 128. The next layer is the RMI layer 202 wherein the RMI Stub 204 implements the interface methods in the application client simply by relaying the method invocation 206 to the RMI Skeleton 208 on the server side. The method invocation 206 is relayed across the network layer 210 via the RMI Runtime services 212 on the Application Server 104 over a network 214 to the RMI Runtime services 216 on the Messaging Server 106. One skilled in the art will appreciate how to construct the RMI structure after reviewing this specification.

Figure 3:
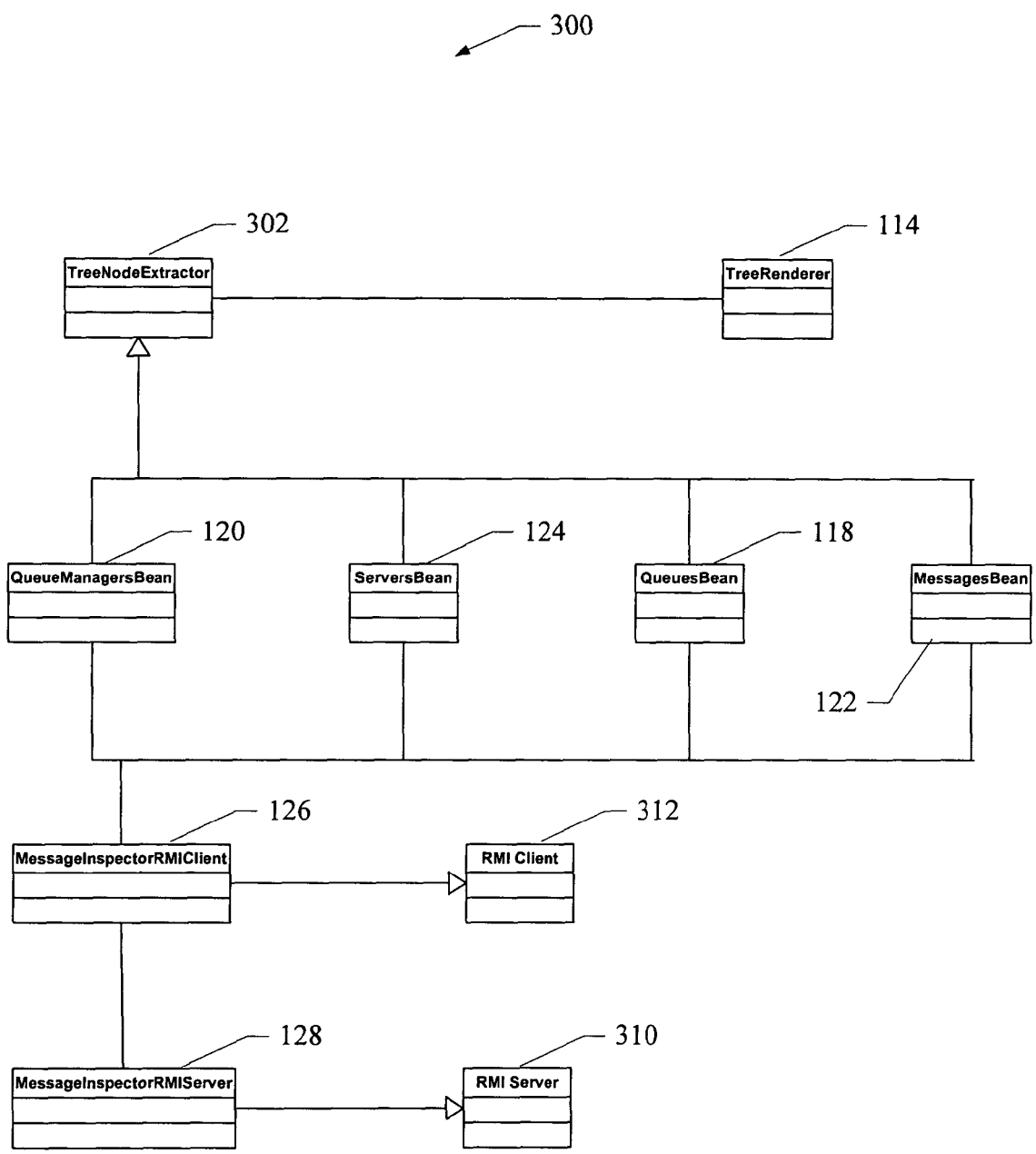
FIG. 3 depicts an exemplary UML class diagram of the illustrative embodiment of the present invention.

FIG. 3 illustrates a UML class diagram 300 for Message Inspector. Tree structure 112 is rendered by Tree Renderer 114, which uses TreeNodeExtractor 302 objects as containers for the data. Each of the Bean classes (i.e., Queue Manager Bean 120, Server Bean 124, Queues Bean 118 and Messages Bean 122) inherits from TreeNodeExtractor 302. The Servers Bean 124 contains the list of servers that have the Message Inspector RMI Server 128 installation. The Queue Manger Bean 120 contains the list of queue managers on a particular server. The Queue Bean 118 contains the list of message queues on a particular queue manager. The Message Bean 122 contains the list of messages on a particular queue. The Message Inspector RMI Client 126 managers the interaction with the Message Inspector RMI server 128. Message Inspector RMI Server 128 supplies the beans with the data they require. Message Inspector RMI Server 128 and Message Inspector RMI Client 126 each implement the required RMI interfaces: RMI Server 310 and RMI Client 312, respectively.

Figure 4:
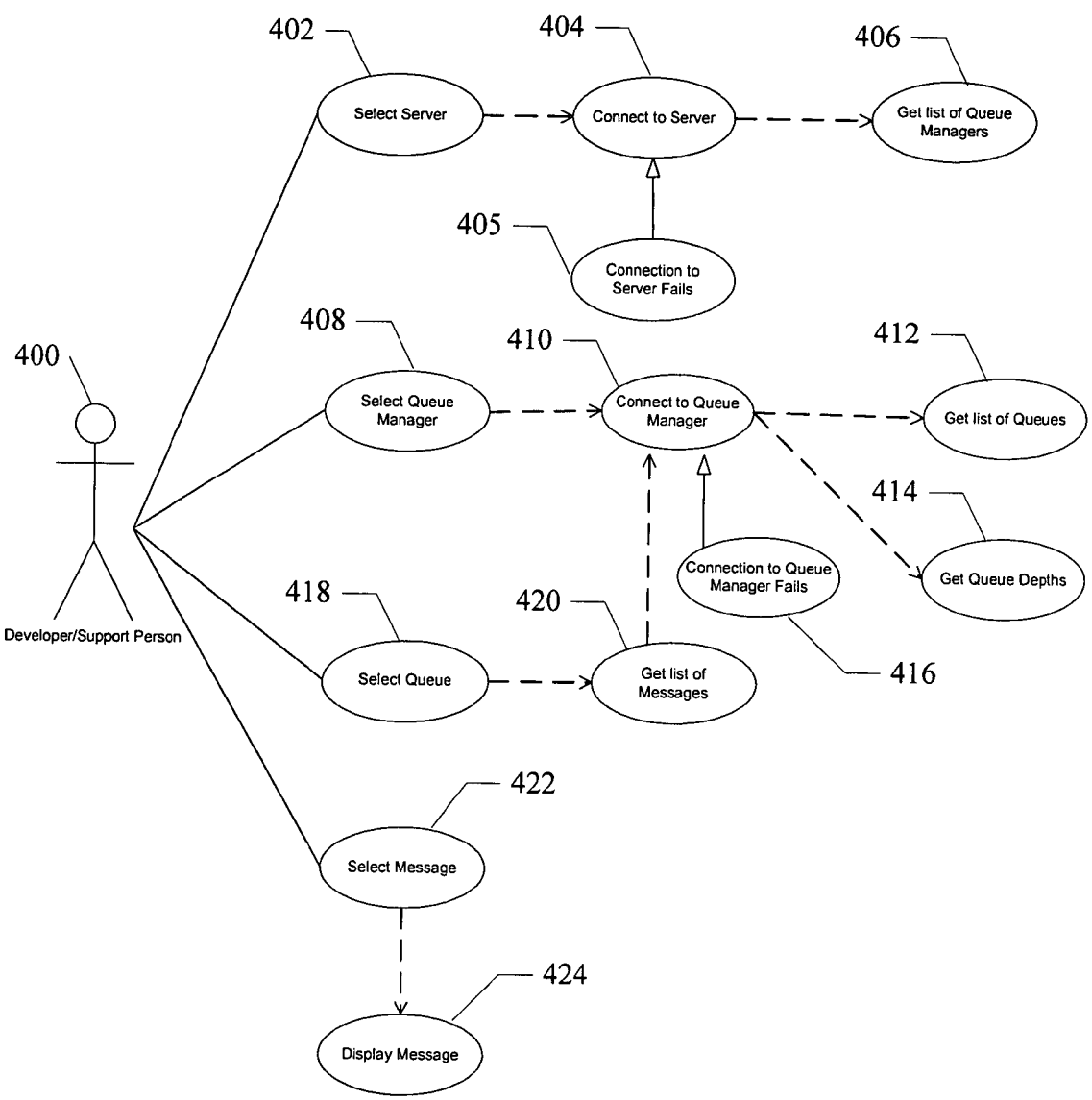
FIG. 4 depicts a UML use case diagram of the illustrative embodiment of the present invention.
Figure 5:
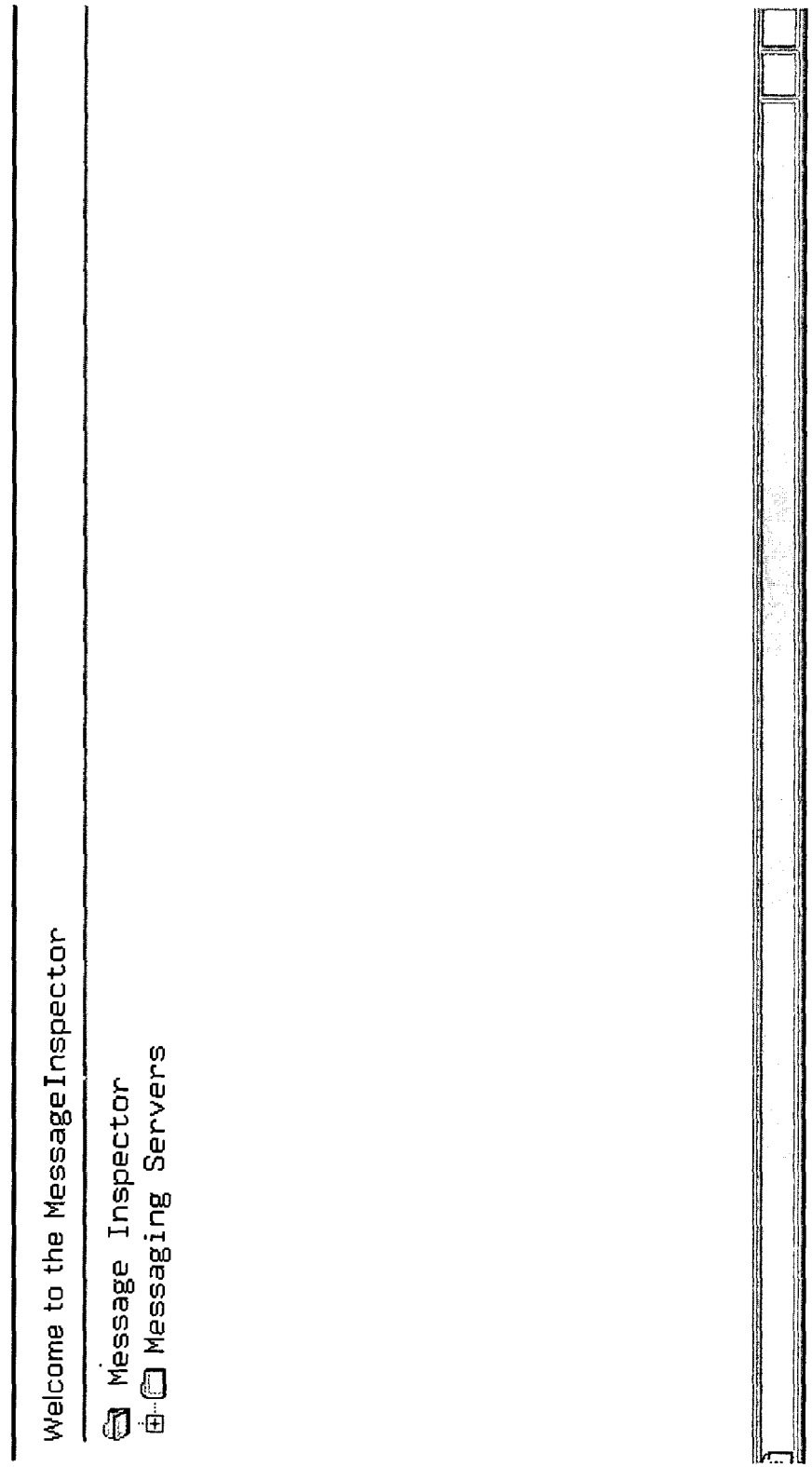
FIG. 5 depicts a first screen shot of an exemplary invocation of this invention.
Figure 6:
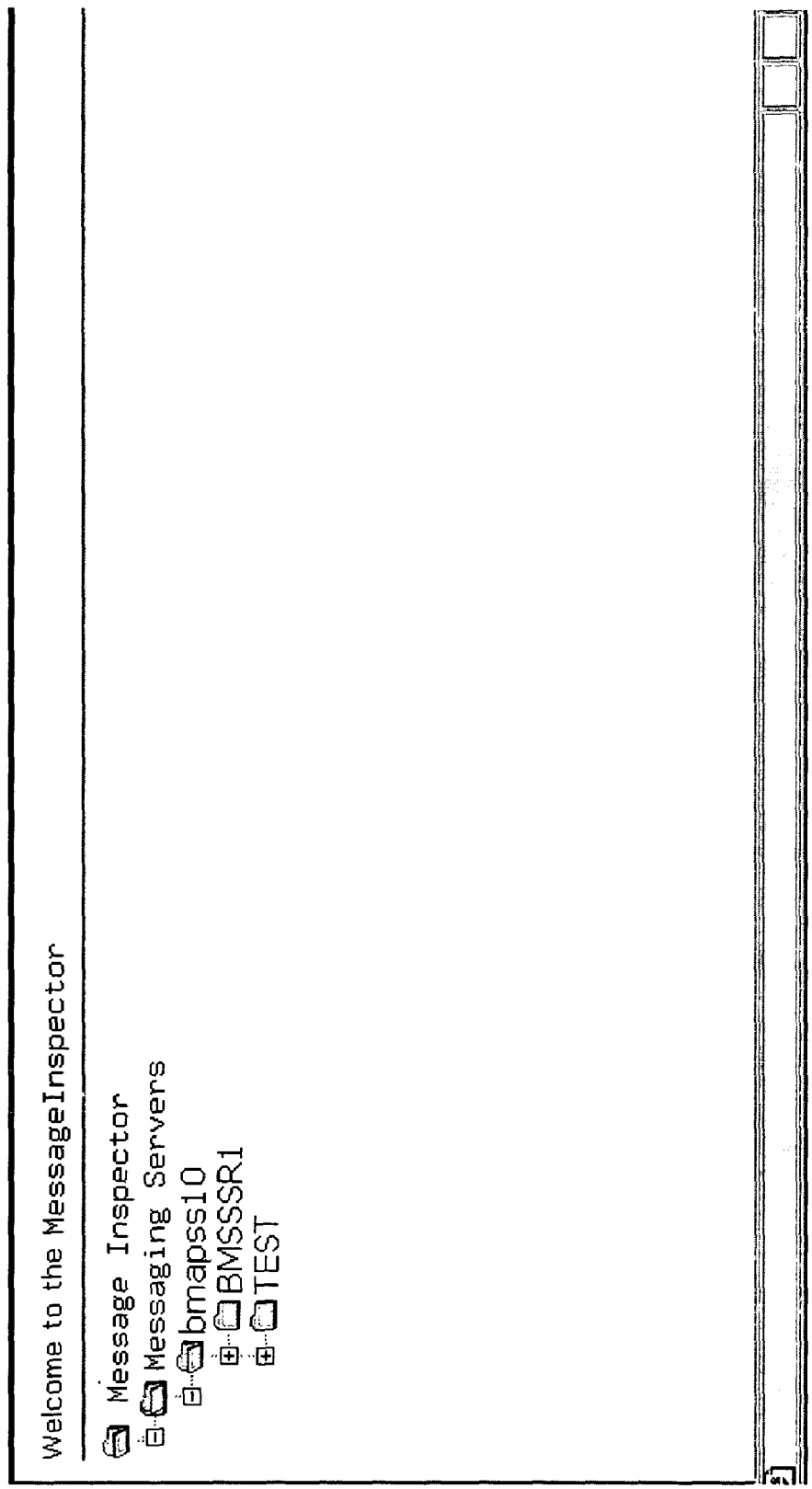
FIG. 6 depicts a second screen shot of an exemplary invocation of this invention.
Figure 7:
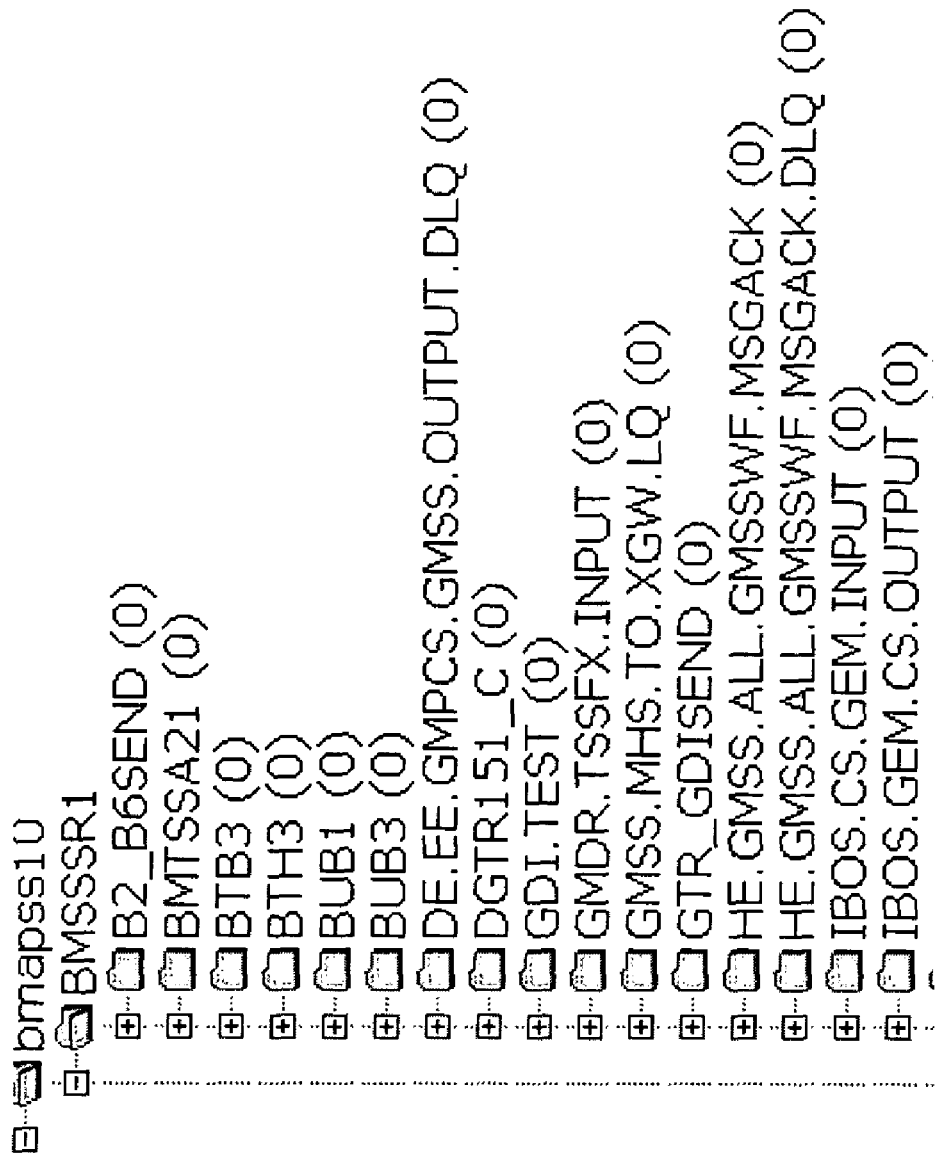
FIG. 7 depicts a third screen shot of an exemplary invocation of this invention, illustrating the results of a multi-platform queue inspection.

FIG. 4 illustrates the set of use case scenarios for a message inspector application according to an exemplary embodiment of this invention. FIG. 4 uses standard UML notation after Jacobson (1994). In order to illustrate more clearly the interaction of each component, each use case scenario is examined in turn. Note that where the term "Message Inspector" is used it is implicit that this is Message Inspector RMI Client 126 and Message Inspector RMI Server acting together as one object. FIGS. 5-7 are used herein as specific examples of what a user might expect to be displayed on web browser 110.

1. Select Server
   a. User 400 selects server 402, see screen shot FIG. 5.
   b. Java script on web browser 110 calls "onclick" method and the server name is sent to the web server object, Tree Renderer 114.
   c. Tree Renderer 114 calls Queue Manager Bean 120.
   d. Queue Manager Bean 120 calls Message Inspector RMI Client 126 "setServer" method, which then invokes connect to server scenario, 2.
   e. A list of queue managers is returned to the Queue Manager Bean 120 and the Tree Renderer 114 then generates the HTML to return to the web browser 110, see screenshot FIG. 6.

2. Connect To Server
   a. Message Inspector RMI Client 126 creates a connection to the Message Inspector RMI Server 128 in 404.
   b. If this fails then an error message string is returned to the Queue Manager Bean 120 in 405.

3. Get List of Queue Managers
   a. Message Inspector RMI Server 128 searches the JMS Messaging Server for installed queue managers in 406.
   b. Message Inspector RMI Server 128 returns the list of queue managers to the Message Inspector RMI Client 126.

4. Select Queue Manager
   a. The user selects a queue manager in 408 and the queue manager name is sent to Tree Renderer 114.
   b. Tree Renderer 114 passes the queue manager name to the Queue Bean 118.
   c. Queue Bean 118 calls Message Inspector RMI Client 126 "setQueueManager" method.
   d. Queue Bean 118 then calls the Message Inspector RMI Client 126 "getQueues" method.

5. Get List of Queues
   a. The Message Inspector connects to the queue manager in 410 and gets a list of queues in 412.
   b. This list of queues is returned to the Queue Bean 118.
   c. For each queue, the Message Inspector then gets the count of messages on that queue (the queue depths) in 414.
   d. Tree Renderer 114 uses the Queue Bean 118 to generate HTML for the web browser 110 showing the list of queues and the number of messages on each queue, see FIG. 7.

6. Connect to Queue Manager
   a. The Message Inspector gets a connection to the queue manager 410.
   b. If this fails then an error message string is returned to the Queue Bean 118 in 416.
   c. This error message is displayed by the Tree Renderer 114 in an HTML page on web browser 110.

7. Get Messages
   a. The Message Inspector selects a queue in 418 and retrieves the messages on the currently selected queue 420.
   b. These messages are returned to the Message Bean 122 and the Tree Renderer 114 uses this bean to generate an HTML page for web browser 110 showing the messages.

8. Display Message
   a. When a message is selected in 422, a java script is called to show the message in a popup window in 424.
   b. If the message is XML then the message is displayed in an XML format. If the message is not in XML, then the message data is just displayed as is.

It is to be understood that the above-described embodiment is merely illustrative of the present invention and that many variations of the above-described embodiment can be devised by one skilled in the art without departing from the scope of the invention. It is therefore intended that such variations be included within the scope of the following claims and their equivalents.

What is claimed is:

1. A method to effect multi-platform queue queries comprising:
   receiving a query regarding status of one or more queue managers and including a server name at a tree renderer located on an application server which includes a queue manager bean and a queue bean, the queue manager bean acting as a container to store a list of queue managers, the queue bean acting as a container to store a list of queues;
   sending a message containing the server name to the queue manager bean from the tree renderer;
   sending a message from the queue manager bean to select the server corresponding to the named server to one of the plurality message servers;
   receiving and storing the list of queue managers from the one of the plurality of message servers at the queue manager bean;
   providing the list of queues managers to the tree renderer by the queue manager bean;
   processing the list of queues managers into a tree structure by the tree renderer;
   receiving a query regarding status of one or more queues and including a queue manager name from the list of queue managers at the tree renderer;
   sending a message from the queue bean to retrieve a list of queues corresponding to the named queue manager to one of the plurality of message servers on multiple platforms;
   receiving and storing the list of queues from the one of a plurality of message servers at the queue bean;
   providing the list of queues to the tree renderer by the queue bean;
   processing the list of queues into the tree structure by the tree renderer; and
   delivering the-tree structure to a user in a web browser on a display.

2. The method of claim 1, further comprising the steps of sending a message containing the queue manager name to the queue bean from the tree renderer and sending a message from the queue bean to select the queue manager corresponding to the named queue manager to one of a plurality message servers before said step of sending a message from the queue bean to retrieve a list of queues.

3. The method of claim 1, further comprising the steps of:
   receiving and storing a number of messages associated with each queue in the retrieved list of queues from the one of a plurality of message servers at the queue bean;
   providing the number of messages associated with each queue to the tree renderer by the queue bean; and
   including the number of messages associated with each queue in the tree structure by the tree renderer.

4. The method of claim 3, further comprising the step of generating HTML by the tree renderer for the web browser to show the list of queues and the number of messages on each queue.

5. The method of claim 1, wherein the application server further includes a message bean, and wherein said method further comprising the steps of:
   sending a request to the one of the plurality of message servers to retrieve messages associated with one queue of the retrieved list of queues;
   receiving and storing the messages from the one of the plurality of message server at the message bean;
   providing the messages to the tree renderer by the message bean; and
   and delivering the messages to a user in the web browser on the display.

6. The method of claim 5, further comprising the step of generating HTML by the tree renderer for the web browser to show the messages.

7. An apparatus for obtaining a status for each of a plurality of queues, wherein the queues operate on a plurality of platforms, said apparatus comprising:
   an input device configured to receive a queue manager status request comprising a server name for retrieving a list of queue managers, and a subsequent queue status request containing a queue manager name selected from the retrieved list of queue managers;
   a processor for running an application server comprising a queue manager bean, a queue bean, and a tree renderer, the tree renderer being configured to receive the server name and to send a message containing the server name to the queue manager bean, the queue manager bean acting as a container to store a list of queue managers, said queue manager bean being configured to send a message to select the server corresponding to the named server to a plurality of platforms, to receive and store the list of queue managers from the plurality of platforms, and to provide the list of queues managers to the tree renderer by the queue manager bean, the tree renderer being further configured to communicate the queue status request to the plurality of platforms and to receive a list of queues managed by the named queue manager from one of the plurality of platforms, the queue bean acting as a container to store a list of queues, the queue bean being configured to send a message to one of said plurality of platforms to retrieve a list of queues corresponding to the named queue manager, and to receive and store the list of queues; and the tree renderer being configured to receive the queue status request containing the queue manager name, and to process the list of queue managers received from the queue manager bean and the list of queues received from the queue bean into a tree structure; and
   a display configured to render the list of queue managers and the list of queues corresponding to the selected queue manager based on the tree structure to a user.

8. The apparatus in accordance with claim 7 wherein said input device and said display comprise a first system and said application server comprises a second system.

9. The apparatus in accordance with claim 7 wherein the application server comprises a J2EE application server.

10. The apparatus in accordance with claim 7 wherein said input device comprises a web browser.

11. The apparatus in accordance with claim 7 wherein said display comprises a web browser.

12. The apparatus in accordance with claim 7 wherein said web browser is configured to display said tree structure.

13. The apparatus of claim 7, wherein the queue bean is further configured to send a message to one of a plurality message servers to select the queue manager corresponding to the queue manager name, and wherein the tree renderer is further configured to send the queue manage name to the queue bean before said tree renderer receives the queue status request containing the queue manager name.

14. The apparatus of claim 7, wherein said queue bean is further configured to receive and store a number of messages associated with each queue in the retrieved list of queues from the one of the plurality of message servers and to provide the number of messages associated with each queue to the tree renderer, and said tree renderer is further configured to include the number of messages associated with each queue in the tree structure.

15. The apparatus of claim 14, wherein the tree renderer is further configured to generate HTML for the web browser to show the list of queues and the number of messages on each queue.

16. The apparatus of claim 7, wherein the application server further includes a message bean, and wherein one of the plurality of message servers is configured to receive a request to retrieve messages associated with one of the retrieved list of queues; wherein said message bean is configured to receive and store the messages from the one of the plurality of message server and to provide the messages to the tree renderer, and wherein said tree renderer is further configured to and deliver the messages to the user in the web browser on the display.

17. The apparatus of claim 16, wherein the tree renderer is further configured to generate HTML for the web browser to show the messages.

* * * * *